No. 725,735. PATENTED APR. 21, 1903.
P. H. MACK.
FRICTION CLUTCH MECHANISM.
APPLICATION FILED DEC. 24, 1902.
NO MODEL. 2 SHEETS—SHEET 1.
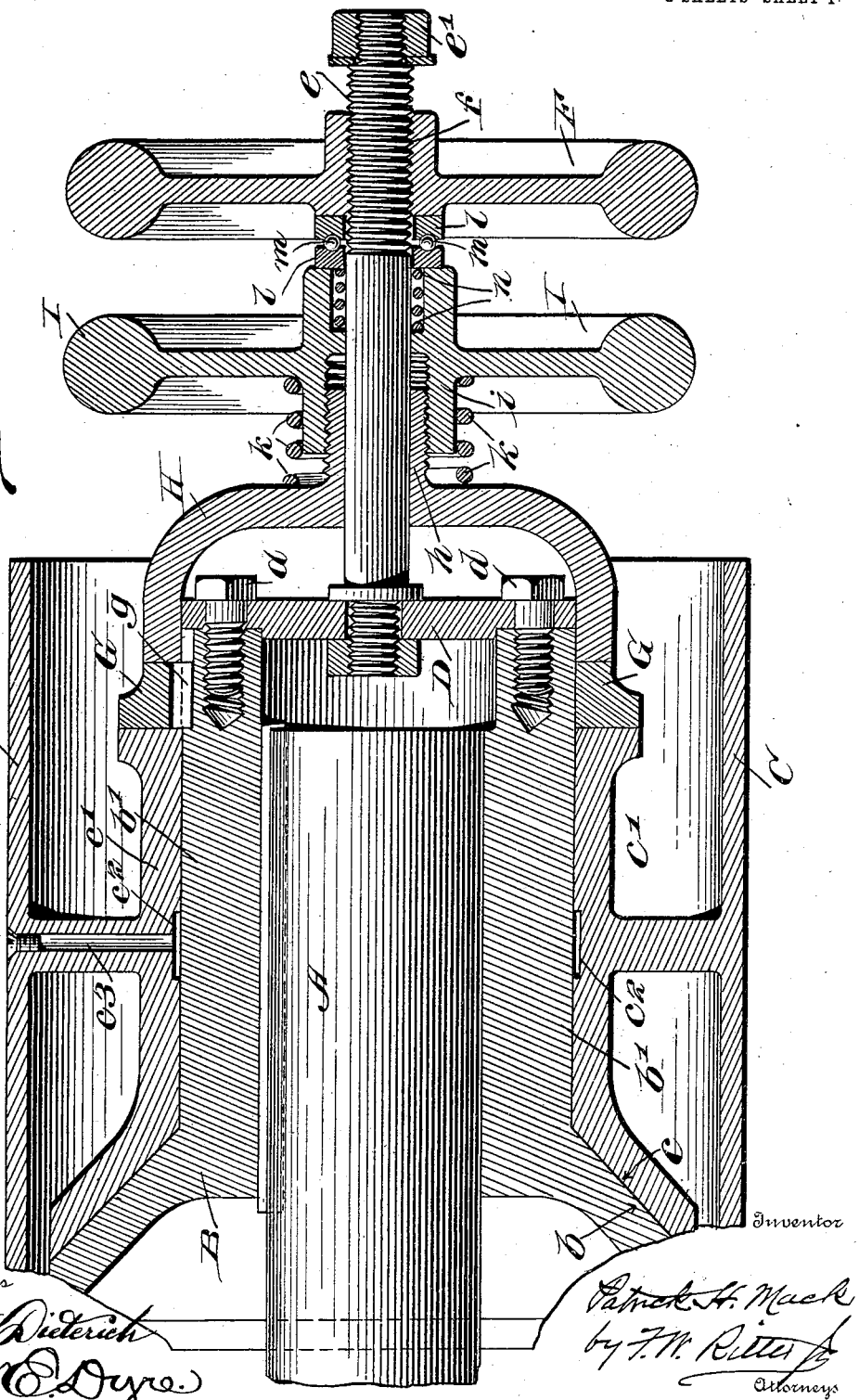

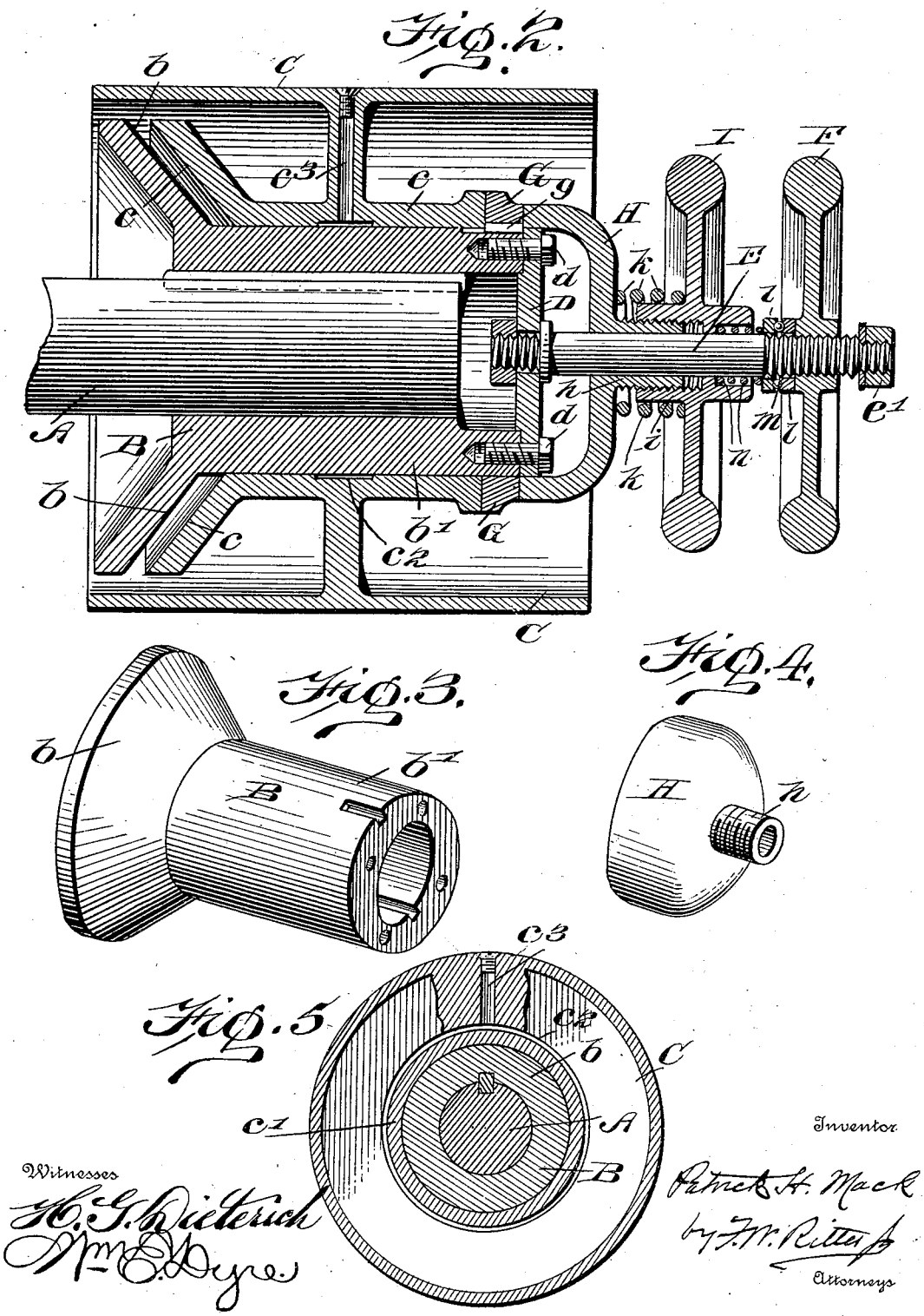

UNITED STATES PATENT OFFICE.

PATRICK H. MACK, OF BRADFORD, PENNSYLVANIA, ASSIGNOR TO OIL WELL SUPPLY COMPANY, OF PITTSBURG, PENNSYLVANIA, A CORPORATION OF PENNSYLVANIA.

FRICTION-CLUTCH MECHANISM.

SPECIFICATION forming part of Letters Patent No. 725,735, dated April 21, 1903.

Application filed December 24, 1902. Serial No. 136,473. (No model.)

*To all whom it may concern:*

Be it known that I, PATRICK H. MACK, a citizen of the United States, residing at Bradford, county of McKean, State of Pennsylvania, have invented certain new and useful Improvements in Friction-Clutch Mechanism; and I hereby declare the following to be a full, clear, and exact description of the same, reference being had to the accompanying drawings, in which—

Figure 1 is a longitudinal central section of a friction-clutch embodying my invention, the several parts being shown in their operative relation. Fig. 2 is a sectional view similar to Fig. 1, somewhat reduced, the parts being shown in the released or inoperative relation. Fig. 3 is a detached perspective view of the inner or hub member of the clutch. Fig. 4 is a detached perspective view of the end or hood member of the device. Fig. 5 is a reduced transverse sectional view of the clutch on the line of the oiling-port.

Like symbols refer to like parts wherever they occur.

My invention relates generally to friction-clutch mechanism, but especially to that class designed for the application of fast and loose pulleys to shafting, and has for its object the production of a simple and efficient shifting mechanism whereby the rotation of the shaft may be utilized to operate the clutch devices regardless of the direction of rotation of said shaft.

To this end the main feature of my invention embraces the combination, with friction-clutch members which are relatively movable longitudinally, of a stem rotatable with one member of the clutch and a plurality of hand-wheels, one of which has a threaded connection with said stem and the other a like connection with means for longitudinally shifting the other member of said clutch, whereby the holding of one or the other of said hand-wheels, according to the direction of rotation, will cause the relative longitudinal movement of the friction members of the clutch.

There are other minor features of invention residing in special combinations and particular details of construction, all as will hereinafter more fully appear.

I will now proceed to describe my invention more fully, so that others skilled in the art to which it appertains may apply the same.

In the drawings, A indicates the shaft to which the friction-clutch is to be applied, B one member, and C the other member, of the clutch, said members B and C being relatively movable longitudinally in order that the friction-faces $b$ and $c$ thereof, which are of conical form, may be caused to engage or disengage, accordingly as the clutch is to become operative or inoperative.

The inner member B of the clutch is provided with the hub $b'$, by which it is keyed to the shaft A to revolve therewith, and its outer end, which projects beyond the shaft A, is closed by a plate or disk D, secured thereto by bolts $d$ or equivalent means. Secured to and projecting axially from the plate or disk D is a stem E, threaded for some distance at its outer end, as at $e$, for the reception of a hand-wheel F, said hand-wheel F having a threaded hub (or nut) $f$, whereby the hand-wheel may be made to traverse the stem E, and the stem E having at its end a jam-nut $e'$ or equivalent means for limiting the outward movement of the hand-wheel F.

It will be noted that the stem E rotates with the clutch member B and the clutch member B with the shaft to which it is keyed. Consequently when the rotation of the hand-wheel F is arrested during the continued movement of the member B and shaft A in direct driving the hand-wheel F will move lineally inward or toward the end of member B, and thus cause the friction-faces $b$ $c$ of the clutch members to engage, while if the shaft A is reversely rotating and the hand-wheel F is held against rotation it will move lineally outward or away from the end of the hub B, and thus permit the friction-faces $b$ $c$ to disengage.

The outer or companion member C of the friction-clutch, which may be the driven pulley, has also its hub member $c'$ and friction-face $c$, and the hub $c'$ may be provided with an oil-groove $c^2$ and oiling-port $c^3$, leading thereto, if desired. The hub $c'$ of the member C terminates short of the end of hub $b'$ of member B, and at such point an annulus or loose collar G encircles the hub $b'$ of the member B and bears on one face against the end of the hub of member C. This loose collar or annulus G is provided with a spline $g$, which travels in a corresponding groove longitudinally disposed in the periphery of the hub of the inner member B, so that the loose collar or annulus G is capable of a longitudinal movement with relation to the member B though compelled to rotate with said member.

H indicates a cap or hood whose inner edge bears against the side of the loose collar or annulus G opposite from that which engages the edge of the hub of member C, and said hood or cap H has an axial opening through which projects the stem E, which is fast on the inner member B of the clutch, and an encircling projection or annular threaded nipple $h$ for the reception of the internally-threaded hub of the second or inner hand-wheel I.

Encircling the hub $i$ of the hand-wheel I is a spiral spring $k$, one end of which bears on the hand-wheel and the other on the hood or cap H, which spring serves to resist the inward movement of the hand-wheel I when its rotary motion is arrested, or, in other words, serves as a brake to prevent the too rapid lineal inward movement of the wheel on the threaded nipple $h$ when the rotation of the said hand-wheel is arrested to release the clutch.

Interposed between the hand-wheels F and I are the annular track-rings $l\ l$ and interposed balls $m$, constituting an antifriction-bearing between the hubs of said hand-wheels F and I when said hubs are in apposition, and in order to take up slack and maintain the relation of the annular track-rings $l\ l$ and antifriction-balls $m$ when the hubs of the hand-wheels F and I separate a spiral spring $n$ is housed in a suitable chamber in the hub of one of the hand-wheels, one end of said spring $n$ bearing on one of the track-rings $l$ and the other end upon the hub of the hand-wheel in which it is housed.

It will be noted that as the hand-wheel I rotates with and through the medium of the hood H and threaded nipple $h$ thereof and controls the longitudinal movement of the member C when the rotation of the hand-wheel I is arrested and the rotation of the member C continues the hood will if the movement of the shaft is that of direct driving travel away or outward from the end of the shaft by reason of its threaded nipple, so that the friction-faces $b\ c$ will be disengaged and the clutch become inoperative, while if the shaft A is running reversely the holding of hand-wheel I will cause the hood or cap H by reason of the threaded nipple $h$ to travel lineally inward or toward the end of the hub $c'$, and thus impart to the hub $c'$ a movement inward, which will cause the friction-faces $b\ c$ to engage or bring the friction-clutch into operation. The friction between the inner end of hood H and the annulus G, which latter is splined to and revolves with the member B and shaft A, taken in connection with the action of the spring, is sufficient to overcome the friction of the thread on nipple $h$, and so when the movement of hand-wheel I is suddenly arrested there will be a tendency to the outward lineal movement of the hand-wheel I, which movement being arrested by the bearing $l$ (or track-ring) will cause an inward movement of the hood H and member C sufficient to bring the friction-faces $b\ c$ of the clutch into engagement. If the members of the clutch are properly constructed and adjusted, a movement of one sixty-fourth ($\frac{1}{64}$) of an inch is all that is required to engage or disengage the clutch members.

From the foregoing description, taken in connection with the drawings, it will be noted that the principle involved is that of two relatively and longitudinally movable friction members, the relative longitudinal movements of which are controlled by two nuts and screws, one of said screw elements being rigidly attached to one member of the clutch, so as to revolve therewith, while the other is independent thereof, so that without regard to the direction of rotation one or the other of the screw elements will produce a relative longitudinal movement of the clutch members.

The clutch members B C, the stem E, hood H, and hand-wheels F and I, being constructed and combined substantially as hereinbefore set forth, will operate as follows: Assuming the parts to be in position shown in Fig. 2 of the drawings (running free) and the shaft rotating as in direct driving, if now the outer hand-wheel F be held against rotation, owing to the thread of the stem E, said hand-wheel will move lineally toward the end of the hub member B, carrying with it the hand-wheel I, hood H, and loose ring G, thus moving member C longitudinally inward until the friction-faces $b\ c$ engage; but if the rotation of the shaft is reverse and the parts are in the position shown in Fig. 1 then the holding of hand-wheel F against rotation will cause the said hand-wheel F to move lineally outward or away from the hub, in which movement it will be followed by the hand-wheel I and hood H, thus releasing the member C and permitting the friction-faces $b\ c$ to separate. Again, assuming the parts to be in the position shown in Fig. 1 and the shaft running as in direct driving, if now the hand-wheel I be held against rotation the hood H, by reason of the threaded nipple $h$, will travel lineally away from the end of the hub of member C, thus releasing the loose ring G and permitting the endwise movement of member C until the friction-faces $b\ c$ disengage, while if the friction-faces $b\ c$ are disengaged, as in Fig. 2, and the shaft is running as in reverse driving the holding of hand-wheel I against rotation will, by reason of threaded nipple $h$, cause the hood H to travel lineally inward, carrying with it the loose ring G and member C until the friction-faces b c engage and the clutch is thrown into operation.

Briefly, by reason of the construction herein shown and described when the shaft A is rotating as in direct driving the clutch may be set by holding the outer hand-wheel F and released by holding the inner hand-wheel I. When the shaft is rotating in reverse direction, the clutch may be set by holding the inner hand-wheel I and released by holding the outer hand-wheel F.

Having thus described the nature, function, and operation of my invention, what I claim, and desire to secure by Letters Patent, is—

1. In a friction-clutch, the combination of a plurality of relatively and longitudinally movable friction members, and corresponding screw shifting elements one of the latter elements attached to and rotatably movable with one of the members of the clutch the other independent thereof, substantially as and for the purposes specified.

2. In a friction-clutch, the combination of a plurality of relatively and longitudinally movable friction members, a threaded stem attached to and movable with one of said members, a hood which engages the other of said members, and hand-wheels one of which is mounted on the threaded stem of one clutch member, and another mounted on a threaded nipple on the hood which engages the other friction member, substantially as and for the purposes specified.

3. In a friction-clutch, the combination of a plurality of relatively and longitudinally movable clutch members, one of said members provided with an axially-disposed threaded stem, a hood through which the said stem passes said hood provided with a threaded nipple, a hand-wheel having a nut which engages the threaded nipple of the hood, and a hand-wheel having a nut which engages the threaded stem of the first-named clutch member, substantially as and for the purposes specified.

4. In a friction-clutch, the combination of a plurality of relatively and longitudinally movable clutch members, a threaded stem attached to and movable with one of said members, a loose ring which encircles and rotates with one of said members and frictionally engages the other of said members, a hood through which the stem of the first-named member passes and which engages the loose ring, and two hand-wheels one of which is mounted on the threaded stem and the other one on the hood, substantially as and for the purposes specified.

5. In a friction-clutch, the combination of a plurality of relatively and longitudinally movable clutch members, a threaded stem attached to and movable with one of said members, a hood having an axial opening for the passage of the stem and which engages the other of said members, two hand-wheels one of which is mounted on the stem and the other on the hood, and a loose spring-supported antifriction-bearing interposed between the hubs of the hand-wheels, substantially as and for the purposes specified.

6. In a friction-clutch, the combination with a plurality of relatively and longitudinally movable clutch members, of a threaded stem attached to and movable with one of said members, a hood provided with an annular threaded nipple through which the said stem passes, a hand-wheel for the stem, a hand-wheel for the hood, and a spring interposed between the hood and its hand-wheel, substantially as and for the purposes specified.

In testimony whereof I affix my signature, in presence of two witnesses, this 20th day of December, 1902.

PATRICK H. MACK.

Witnesses:
WM. E. DYRE,
HUGH M. STERLING.